United States Patent
Boyd et al.

(10) Patent No.: US 11,926,255 B2
(45) Date of Patent: Mar. 12, 2024

(54) UNIVERSAL ANTI-THEFT BRACKET FOR COMMERCIAL VEHICLE LIGHTING

(71) Applicant: R.A. Phillips Industries, Inc., Santa Fe Springs, CA (US)

(72) Inventors: Jonathon Boyd, Loveland, CO (US); John Sasta, Shelby Township, MI (US); Peter John Pless, South Ogden, UT (US)

(73) Assignee: R.A. PHILLIPS INDUSTRIES, INC., Santa Fe Springs, CA (US)

( * ) Notice: Subject to any disclaimer, the term of this patent is extended or adjusted under 35 U.S.C. 154(b) by 0 days.

(21) Appl. No.: 18/341,726

(22) Filed: Jun. 26, 2023

(65) Prior Publication Data
US 2023/0415639 A1   Dec. 28, 2023

Related U.S. Application Data

(60) Provisional application No. 63/355,505, filed on Jun. 24, 2022.

(51) Int. Cl.
*F21V 15/00* (2015.01)
*B60Q 1/26* (2006.01)

(52) U.S. Cl.
CPC .......... *B60Q 1/2615* (2013.01); *F21V 15/005* (2013.01)

(58) Field of Classification Search
CPC ............................ B60Q 1/2615; F21V 15/005
See application file for complete search history.

(56) References Cited

U.S. PATENT DOCUMENTS

| | | | |
|---|---|---|---|
| 2,092,989 A | 9/1937 | Sorensen et al. | |
| 2,853,595 A | 9/1958 | Baldwin | |
| 3,783,265 A * | 1/1974 | Carr | B60Q 1/2615 362/548 |
| 7,819,374 B2 * | 10/2010 | Pitlor | H02G 3/20 248/544 |
| 2010/0220491 A1 | 9/2010 | Johnson et al. | |
| 2013/0148374 A1 * | 6/2013 | Branstetter | B60Q 1/263 362/543 |
| 2016/0375822 A1 * | 12/2016 | Ehrlich | B60R 25/00 362/549 |
| 2023/0226997 A1 * | 7/2023 | Cruz Hernandez | B60R 1/06 359/871 |

FOREIGN PATENT DOCUMENTS

| | | |
|---|---|---|
| JP | 6504831 B2 | 4/2019 |
| KR | 10-0977872 B1 | 8/2010 |

OTHER PUBLICATIONS

International Search Report and Written Opinion dated Oct. 12, 2023, issued in corresponding PCT Application No. PCT/US2023/069105 (6 pages).

* cited by examiner

*Primary Examiner* — Evan P Dzierzynski
(74) *Attorney, Agent, or Firm* — Lewis Roca Rothgerber Christie LLP

(57) ABSTRACT

A transparent anti-theft bracket for a marker light includes a transparent body having a first side and a second side opposite the first side, a first tapered opening extending from the first side toward the second side, a second tapered opening extending from the second side toward the first side, and a lip between the first tapered opening and the second tapered opening. The lip defines an opening connecting the first tapered opening to the second tapered opening. A first depth of the first tapered opening is less than a second depth of the second tapered opening.

16 Claims, 5 Drawing Sheets

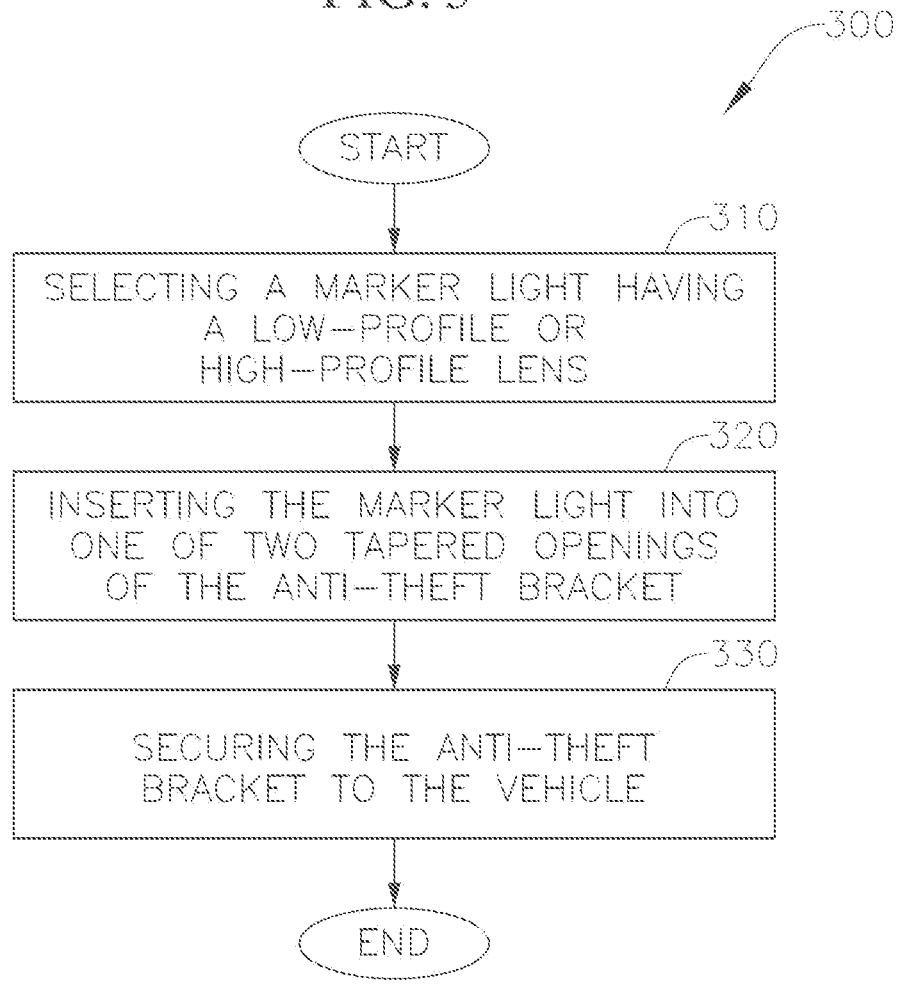

UNIVERSAL ANTI-THEFT BRACKET FOR COMMERCIAL VEHICLE LIGHTING

CROSS-REFERENCE TO RELATED APPLICATION(S)

This application claims priority to U.S. Provisional Application No. 63/355,505, filed Jun. 24, 2022, the entire content of which is incorporated herein by reference.

BACKGROUND

1. Field

The present disclosure relates to lighting solutions in heavy duty vehicles and methods of installing lighting solutions.

2. Description of Related Art

Marker lights (also known as "penny marker lights") help to reveal the entire size and length of commercial vehicles, especially during nighttime driving. The problem of theft of these lights has initiated the need of anti-theft solutions. Current solutions are not compatible with all variations of penny marker lights on the market and limit the visibility angle of the marker lights.

The above information disclosed in this Background section is only for enhancement of understanding of the invention, and therefore it may contain information that does not form the prior art that is already known to a person of ordinary skill in the art.

SUMMARY

The present disclosure relates to various embodiments of an anti-theft bracket for a light. In one embodiment, the anti-theft bracket includes a transparent body having a first side and a second side opposite the first side, a first tapered opening extending from the first side toward the second side, a second tapered opening extending from the second side toward the first side, and a lip between the first tapered opening and the second tapered opening. The lip defines an opening connecting the first tapered opening to the second tapered opening. A first depth of the first tapered opening is less than a second depth of the second tapered opening.

The transparent body may include a transparent acrylic material or a transparent thermoplastic material.

The transparent body may have rounded ends. The transparent body may have an elliptic cylinder shape.

The anti-theft bracket may include at least one through hole configured to accommodate a fastener. The through hole extends from the first side to the second side of the transparent body.

The first tapered opening may be coaxial with the second tapered opening.

The first depth may be in a range from approximately 25% to approximately 35% of a thickness of the transparent body, and the second depth may be in a range from approximately 60% to approximately 50% of the thickness of the transparent body.

A thickness of the lip may be in a range from approximately 8% to approximately 16% of the thickness of the transparent body.

The thickness of the transparent body may be approximately 0.4 inch (10.2 mm), the depth of the first tapered opening may be approximately 0.12 inch (3.0 mm), and the depth of the second tapered opening may be approximately 0.23 inch (5.8 mm).

The thickness of the lip may be approximately 0.05 inch (1.3 mm).

The first side and the second side of the transparent body may be planar (or substantially planar).

The present disclosure is also directed to various embodiments of a light assembly. In one embodiment, the light assembly includes the anti-theft bracket and a marker light including a lens. The marker light is accommodated in the first tapered opening or the second tapered opening, a diameter of the opening defined by the lip is less than a diameter of the lens, and the lip contacts the lens.

The present disclosure is also directed to various embodiments of a method of installing a marker light on a vehicle utilizing the anti-theft bracket. In one embodiment, the method inserting the marker light into the first tapered opening or the second tapered opening depending on a height of a lens and/or grommet of the marker light and securing the anti-theft bracket to the vehicle.

Securing the anti-theft bracket to the vehicle may include inserting blind rivets into through holes in the transparent body and utilizing a rivet tool to attach the anti-theft bracket to the vehicle with the blind rivets.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

The accompanying drawings, together with the specification, illustrate exemplary embodiments of the present disclosure, and, together with the description, serve to explain aspects of embodiments of the present disclosure. In the drawings, like reference numerals are used throughout the figures to reference like features and components. The figures are not necessarily drawn to scale. The above and other features and aspects of the invention will become more apparent from the following detailed description of illustrative embodiments thereof with reference to the attached drawings, in which:

FIG. 5 is a flowchart illustrating tasks of a method of securing a marker light to a vehicle with the anti-theft bracket according to some embodiments of the present disclosure.

DETAILED DESCRIPTION

The present disclosure relates to various embodiments of an anti-theft bracket for mounting a light (e.g., a marker light, also known as a "penny" light) on a vehicle, such as a heavy-duty truck or a trailer. In one or more embodiments, the anti-theft bracket may be a "universal" bracket that is configured to be installed in one of two orientations to accommodate marker lights having different configurations (sizes and shapes), such as marker lights having one of two standard lens heights and varying arrangements of the grommet used to secure the penny light. Furthermore, in one or more embodiments, the anti-theft bracket is formed of a rigid and transparent material (such as transparent acrylic or transparent thermoplastic) such that the light emitted from the marker light passes through the anti-theft bracket, which increases the visibility of the marker light. The anti-theft bracket also includes a lip configured to retain the marker light in the anti-theft bracket and prevent theft by pulling or prying out the marker light, such as with a screwdriver.

Figure 1A:
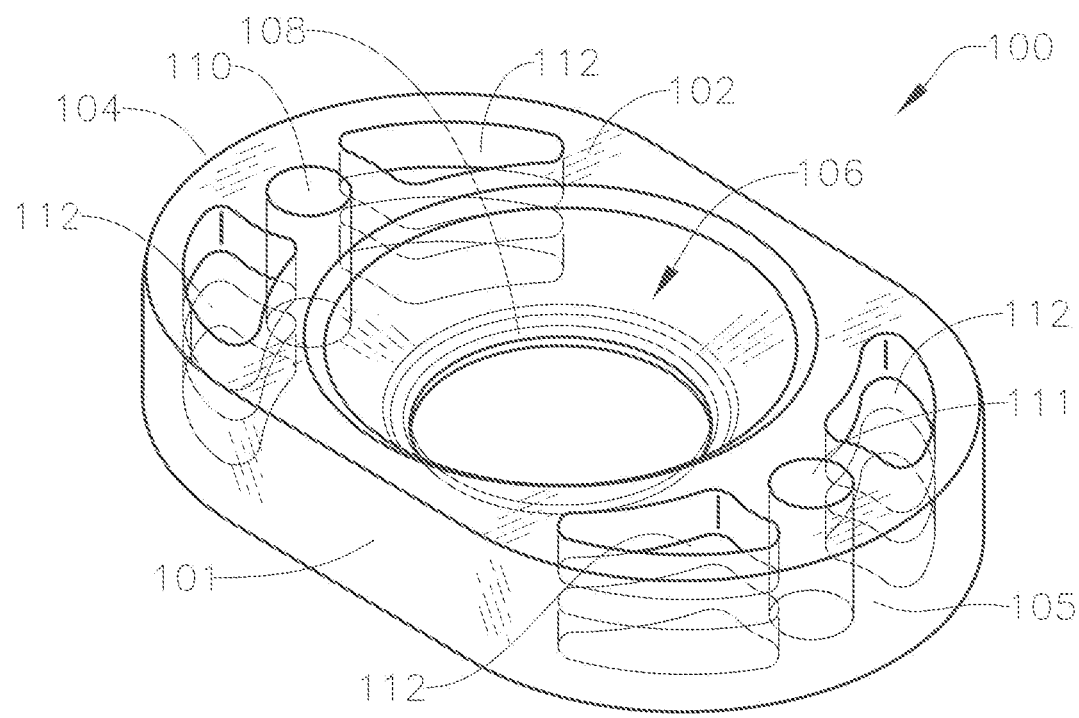
FIGS. 1A-1B are a front perspective view and a rear perspective view, respectively, of an anti-theft bracket for lighting, according to some embodiments of the present disclosure.
Figure 1B:
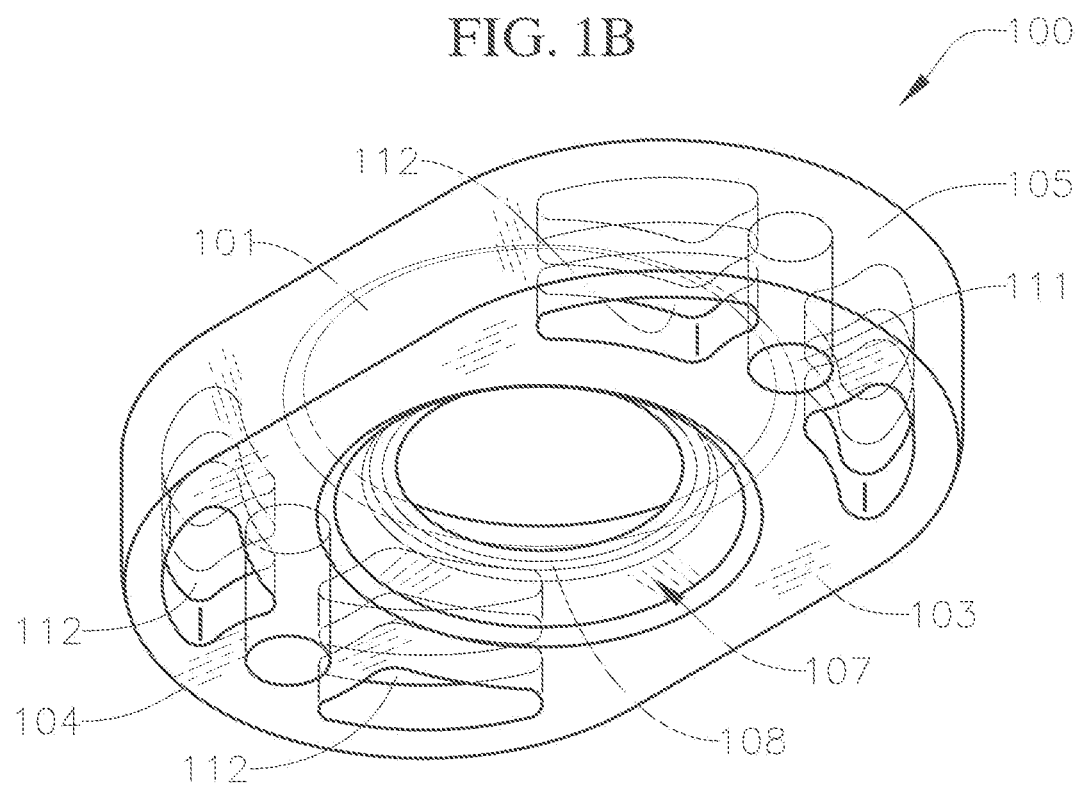

With reference now to FIGS. 1A-1B, an anti-theft bracket 100 for a marker light according to one embodiment of the present disclosure includes a transparent block or body 101 having a first side 102 (e.g., a first planar face or surface) and a second side 103 (e.g., a second planar face or surface) opposite to the first side 102. The transparent body 101 may be formed from any suitable transparent and rigid material, such as a transparent acrylic material or a transparent thermoplastic material. Additionally, in the illustrated embodiment, the transparent body 101 has a generally elliptic cylindrical shape with a pair of curved (e.g., semi-circular) ends 104, 105 that extend perpendicular (or substantially perpendicular) to the first and second sides 102, 103. As described in more detail below, the light emitted from the marker light is configured to pass through the transparent body 101, and the curved ends 104, 105 of the transparent body 101 are configured to minimize (or at least mitigate against) the scattering (e.g., reflection and/or refraction) of the light emitted from the marker light, which would otherwise create dark spots and thereby reduce the overall visibility of the marker light. Thus, the shape of the transparent body 101 is configured to enable uniform or substantially uniform brightness of the light emitted from marker light by eliminating or at least reducing the presence of dark spots. In one or more embodiments the transparent body 101 may have another shape configured to enable uniform or substantially uniform brightness and eliminate (or at least reduce) the presence of dark spots, such as a cylindrical shape. The transmissibility of the transparent body 101 to the light emitted from the marker light enables the vehicle to comply with the relevant transportation department regulations such as, but not limited to 49 C.F.R. § 571.108 "Standard No. 108; Lamps, reflective devices, and associated equipment."

In the illustrated embodiment, the anti-theft bracket 100 has a first tapered opening 106 extending from the first side 102 toward the second side 103. The first tapered opening 106 tapers from a relatively larger diameter $D_1$ at the first side 102 to a relatively smaller diameter $D_2$ in an interior of the transparent body 101. In the illustrated embodiment, the anti-theft bracket 100 also has a second tapered opening 107 extending from the second side 103 toward the first side 102. The second tapered opening tapers 107 from a relatively larger diameter $D_3$ at the second side 103 to a relatively smaller diameter $D_4$ in the interior of the transparent body 101. In the illustrated embodiment, the first and second tapered openings 106, 107 are coaxial (i.e., a centerline of the first tapered opening 106 is aligned or substantially aligned with a centerline of the second tapered opening 107).

Additionally, in the illustrated embodiment, the depth of the first tapered opening 106 is less than the depth of the second tapered opening 107. As described in more detail below, the different depths of the first and second tapered openings 106, 107 enable the anti-theft bracket 100 to accommodate marker lights having different configurations (i.e., the tapered opening 106, 107 that is utilized to accommodate the marker light may be selected depending on the configuration of the marker light).

In one or more embodiments, the depth of the first tapered opening 106 may be in a range from approximately 25% to approximately 35% of the thickness of the transparent body 101 (i.e., the distance from the first side 102 to the second side 103) and the second tapered opening 107 may be in a range from approximately 60% to approximately 50% of the thickness of the transparent body 101. In one embodiment, the transparent body 101 may have a thickness of approximately 0.4 inch (10.2 mm), the depth of the first tapered opening 106 may be approximately 0.12 inch (3.0 mm), and the depth of the second tapered opening 107 may be approximately 0.23 inch (5.8 mm).

Additionally, in the illustrated embodiment, the anti-theft bracket 100 includes a lip 108 (e.g., an annular lip) between the first tapered opening 106 and the second tapered opening 107. The lip 108 extends radially inward from the relatively smaller inner diameters $D_2$, $D_4$ of the first and second tapered openings 106, 107, respectively. such that the lip 108 overhangs the inner ends of the first and second tapered openings 106, 107. The lip 108 defines an opening 109 connecting the first tapered opening 106 to the second tapered opening 107. In the illustrated embodiment, the diameter $D_5$ of the opening 109 defined by the lip 108 is smaller than the relatively smaller diameters $D_2$, $D_4$ of the first and second tapered openings 106, 107. As described in more detail below, the diameter $D_5$ of the opening 109 defined by the lip 108 is smaller than the diameter of the lens of the marker light such that the lip 108 contacts the lens of the light when the marker is accommodated in either first tapered opening 106 or the second tapered opening 107. In this manner, the close fit between the lip 108 and the lens of the marker light and the rigidity of the lip 108 provides an anti-theft function by preventing the marker light from being removed (e.g., by pulling or prying the marker light with a screwdriver) through the tapered opening 106 or 107 that is not being utilized to accommodate the marker light. For instance, if the marker light is accommodated (e.g., housed) in the first tapered opening 106, the lip 108 prevents the marker light from being pulled or pried out through the second tapered opening 107. Similarly, if the marker light is accommodated (e.g., housed) in the second tapered opening 107, the lip 108 prevents the marker light from being pulled out through the first tapered opening 106. In this manner, the lip 108 is configured to retain the marker light in the desired tapered opening 106 or 107 and prevent (or at least mitigate against the risk of) theft of the marker light. The close fit between the lip 108 and the lens of the marker light is also configured to prevent (or at least mitigate against) the ingress of foreign object debris (FOD) (e.g., dust and/or moisture), which might otherwise damage or degrade the marker light (i.e., the close contact between the lip 108 and the lens of the marker light is configured to mitigate against the ingress of FOD through the tapered openings 106, 107 in the transparent body 101). In one or more embodiments, the thickness of the lip 108 may be in a range from approximately 8% to approximately 16%. For instance, in one embodiment in which the transparent body 101 has a thickness of approximately 0.4 inch (10.2 mm), the lip 108 may have a thickness of approximately 0.05 inch (1.3 mm).

In the illustrated embodiment, the anti-theft bracket 100 also includes at least one opening (e.g., a pair of holes) configured to receive fasteners to secure the anti-theft bracket 100 and the marker light accommodated therein or thereby to a vehicle. In the illustrated embodiment, the anti-theft bracket 100 includes a pair of through holes 110, 111 extending from the first side 102 to the second side 103. In one or more embodiments, the anti-theft bracket 100 may be secured to the vehicle with blind rivets passing through the through holes 110, 111. The rigidity of the transparent body 101 (e.g., the rigidity of the transparent acrylic material or the transparent thermoplastic material) enables the transparent body 101 to withstand the forces associated with installing the blind rivets (e.g., the forces associated with utilizing a rivet gun to pull the mandrel through the rivet head to deform the rivet head). In one or more embodiments, the anti-theft bracket 100 may be secured to the vehicle with any other type or kind of fastener that cannot be removed by unscrewing. Utilizing rivets, or other fasteners that cannot be unscrewed, to secure the anti-theft bracket 100 to the vehicle prevents the anti-theft bracket 100 from being detached by unscrewing fasteners, which would defeat the anti-theft feature of the lip 108.

The anti-theft bracket 100 may also include one or more lightening recesses 112 in the transparent body 101 that reduce the amount of material and the overall weight of the anti-theft bracket 100. In the illustrated embodiment, the anti-theft bracket 100 includes four lightening recesses 112 in the first side 102 (e.g., two lightening recesses 112 proximate to the first through hole 110 and two lightening recesses 112 proximate to the second through hole 111) and includes four lightening recesses 112 in the second side 103 (e.g., two lightening recesses 112 proximate to the first through hole 110 and two lightening recesses 112 proximate to the second through hole 111). In one or more embodiments, the one or more lightening recesses 112 may be omitted.

Figure 2A:
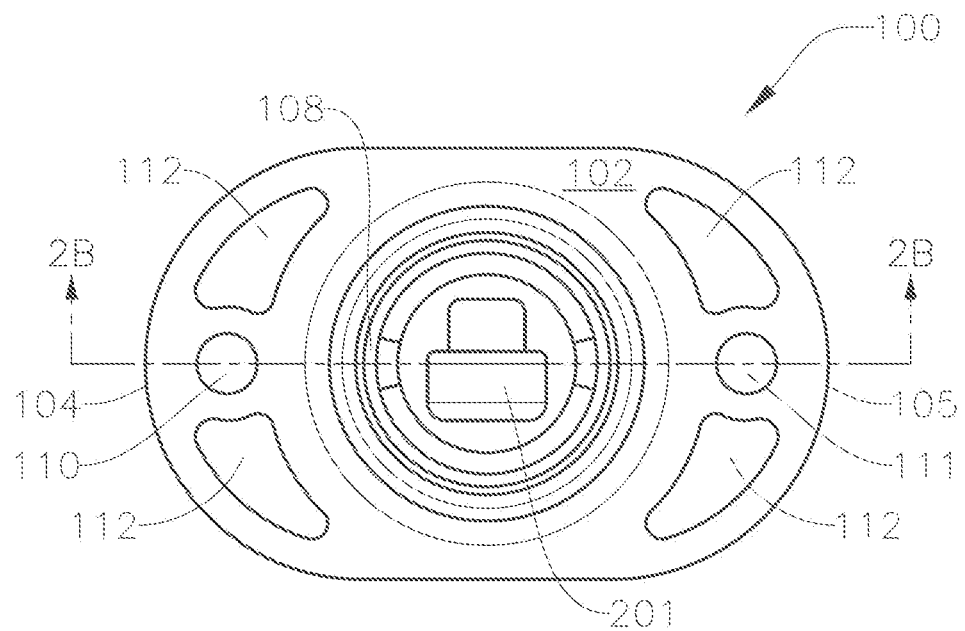
FIGS. 2A-2B are a top view and a cross-sectional view, respectively, of the embodiment of the anti-theft bracket of FIGS. 1A-1B accommodating a light having a relatively high-profile lens, according to some embodiments of the present disclosure.
Figure 2B:
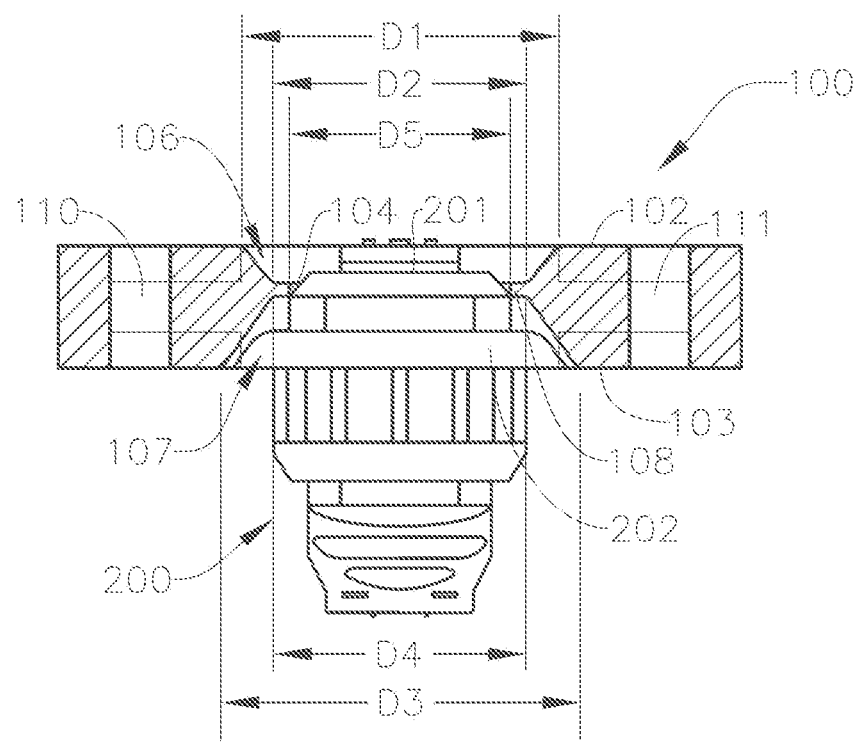
Figure 3A:
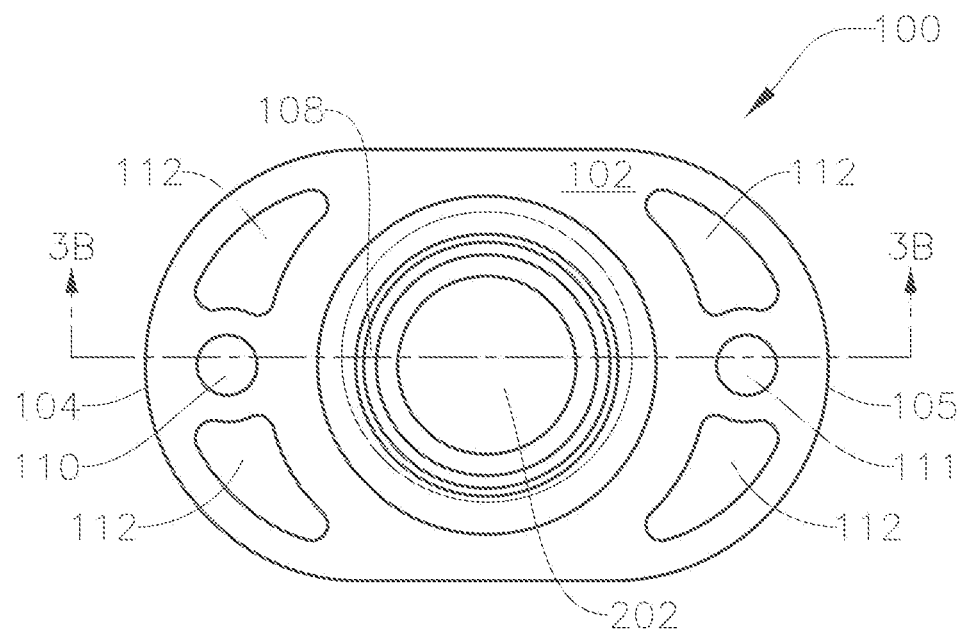
FIGS. 3A-3B are a top view and a cross-sectional view, respectively, of the embodiment of the anti-theft bracket of FIGS. 1A-1B accommodating a light having a relatively low-profile lens, according to some embodiments of the present disclosure.
Figure 3B:
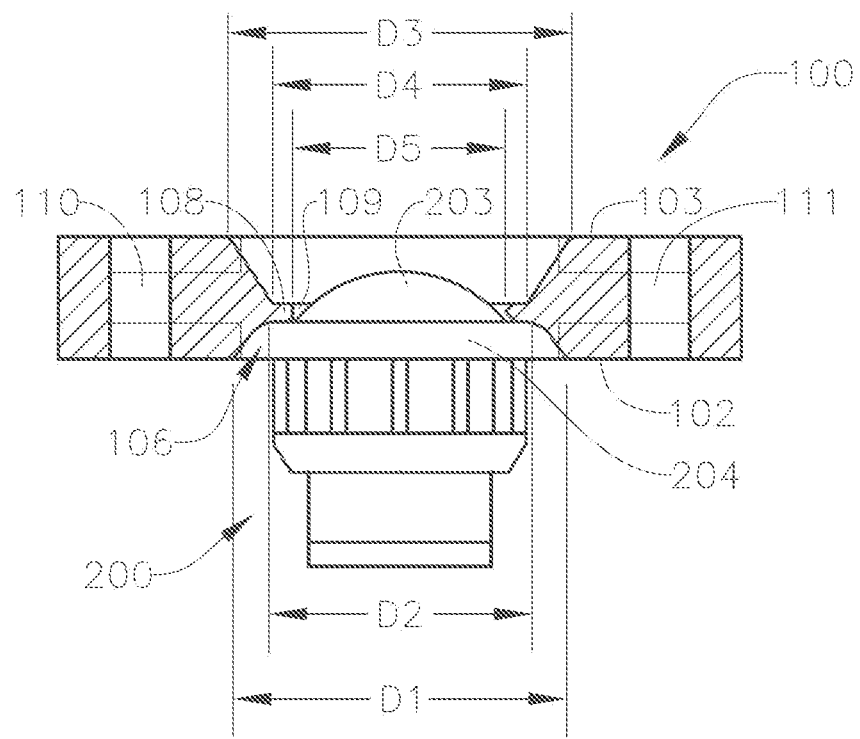
Figure 4A:
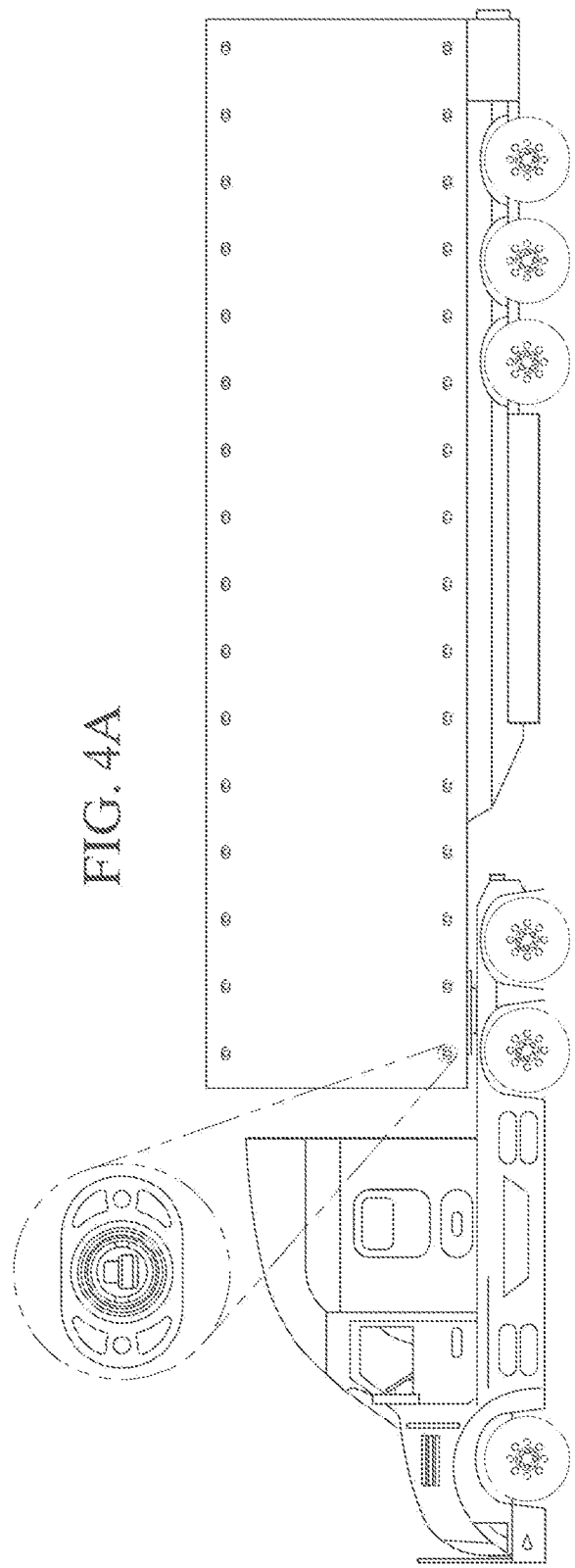
FIG. 4A is a side view depicting the anti-theft bracket securing the light with the relatively high-profile lens to a vehicle.
Figure 4B:
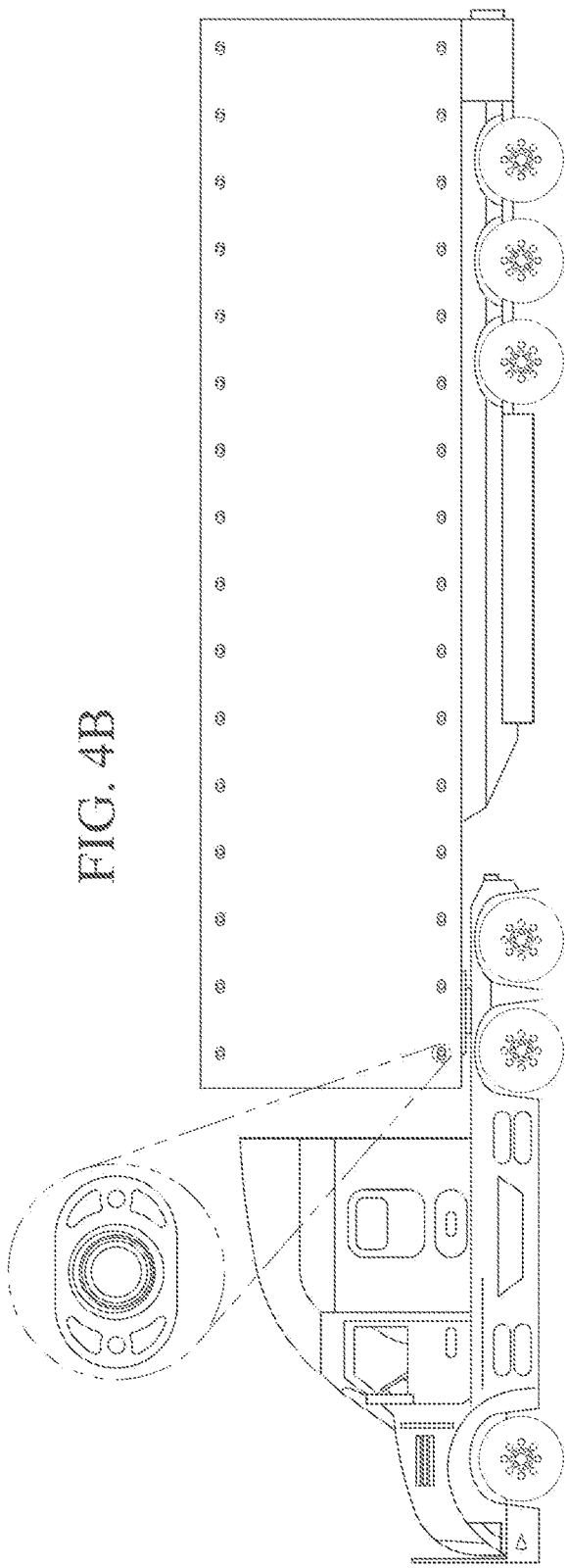
FIG. 4B is a side view depicting the anti-theft bracket securing the light with the relatively low-profile lens to a vehicle.

FIGS. 2A-2B depict the anti-theft bracket 100 accommodating a marker light 200 having a relatively high-profile lens 201 and a grommet 202 therefore in the second tapered opening 107, and FIGS. 3A-3B depict the anti-theft bracket 100 accommodating a marker light 200 having a relatively low-profile lens 203 and a grommet 204 therefore in the first tapered opening 106. The anti-theft bracket 100 may be installed in one of two orientations or configuration depending on the configuration of the marker light 200 (e.g., depending on whether the marker light has a high-profile lens 201 or a low-profile lens 203, and the shape and size of the corresponding grommet 202, 204, respectively). For instance, as illustrated in FIG. 4A, when the marker light 200 having the relatively high-profile lens 201 is accommodated in the second tapered opening 107 of the transparent body 101, the second side 103 of the transparent body 101 faces the vehicle (e.g., the second side 103 of the transparent body 101 directly contacts the vehicle) and the first side 102 faces away from the vehicle. As illustrated in FIG. 4B, when the marker light 200 having the relatively low-profile lens 203 is accommodated in the first tapered opening 106 of the transparent body 101, the first side 102 of the transparent body 101 faces the vehicle (e.g., the first side 102 of the transparent body 101 directly contacts the vehicle) and the second side 103 faces away from the vehicle. In this manner, the anti-theft bracket 100 is a "universal" bracket configured to accommodate marker lights 200 having different configurations.

FIG. 5 is a flowchart illustrating tasks of a method 300 of securing a marker light to a vehicle with an anti-theft bracket according to one embodiment of the present disclosure. The anti-theft bracket may be the same as or similar to the embodiment of the anti-theft bracket 100 described above with reference to FIGS. 1-4B.

In the illustrated embodiment, the method 300 includes a task 310 of selecting a marker light having a desired configuration (e.g., selecting the marker light 200 having the high-profile lens 201 or a low-profile lens 203).

In the illustrated embodiment, the method 300 also includes a task 320 of inserting the marker light into the first tapered opening 106 or the second tapered opening 107 depending on the configuration of the marker light selected in task 310. For instance, if the marker light 200 selected in task 310 includes the high-profile lens 201, the task 320 includes inserting the marker light 200 into the second tapered opening 107. If the marker light 200 selected in task 310 includes the low-profile lens 203, the task 320 includes inserting the marker light 200 into the first tapered opening 106.

In the illustrated embodiment, the method 300 also includes a task 330 of orienting (e.g., flipping) the anti-theft bracket 100 and securing the anti-theft bracket 100 and the marker light 200 accommodated therein to a vehicle (e.g., to the guard rail of a truck). In one or more embodiments, the task 330 of securing the anti-theft bracket 100 and the marker light 200 accommodated therein to the vehicle includes inserting blind rivets into the through holes 110, 111 and utilizing a rivet tool (e.g., a manual hand riveter or a powered riveter, such as a pneumatic or electric riveter) to attach the anti-theft bracket 100 to the vehicle.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention. Although relative terms such as "outer," "inner," "upper," "lower," and similar terms have been used herein to describe a spatial relationship of one element to another, it is understood that these terms are intended to encompass different orientations of the various elements and components of the invention in addition to the orientation depicted in the figures. Additionally, as used herein, the term "substantially," "about," and similar terms are used as terms of approximation and not as terms of degree, and are intended to account for the inherent deviations in measured or calculated values that would be recognized by those of ordinary skill in the art. Furthermore, as used herein, when a component is referred to as being "on" another component, it can be directly on the other component or components may also be present therebetween. Moreover, when a component is component is referred to as being "coupled" to another component, it can be directly attached to the other component or intervening components may be present therebetween.

What is claimed is:

1. An anti-theft bracket for a marker light, the anti-theft bracket comprising:
   a transparent body having a first side and a second side opposite the first side;
   a first tapered opening extending from the first side toward the second side;
   a second tapered opening extending from the second side toward the first side; and
   a lip between the first tapered opening and the second tapered opening, the lip defining an opening connecting the first tapered opening to the second tapered opening,
   wherein a first depth of the first tapered opening is less than a second depth of the second tapered opening.

2. The anti-theft bracket of claim 1, wherein the transparent body comprises a transparent acrylic material.

3. The anti-theft bracket of claim 1, wherein the transparent body comprises a transparent thermoplastic material.

4. The anti-theft bracket of claim 1, wherein the transparent body has rounded ends.

5. The anti-theft bracket of claim 4, wherein the transparent body has an elliptic cylinder shape.

6. The anti-theft bracket of claim 1, further comprising at least one through hole configured to accommodate a fastener, the at least one through hole extending from the first side to the second side.

7. The anti-theft bracket of claim 1, the first tapered opening is coaxial with the second tapered opening.

8. The anti-theft bracket of claim 1, wherein the first depth is in a range from approximately 25% to approximately 35% of a thickness of the transparent body.

9. The anti-theft bracket of claim 8, wherein the second depth is in a range from approximately 60% to approximately 50% of the thickness of the transparent body.

10. The anti-theft bracket of claim 9, wherein a thickness of the lip is in a range from approximately 8% to approximately 16% of the thickness of the transparent body.

11. The anti-theft bracket of claim 10, wherein the thickness of the transparent body is approximately 0.4 inch (10.2 mm), wherein the first depth of the first tapered opening is approximately 0.12 inch (3.0 mm), and wherein the second depth of the second tapered opening is approximately 0.23 inch (5.8 mm).

12. The anti-theft bracket of claim 11, wherein the thickness of the lip is approximately 0.05 inch (1.3 mm).

13. The anti-theft bracket of claim 1, wherein each of the first side and the second side is planar.

14. A light assembly comprising:
   the anti-theft bracket of claim 1; and
   a marker light comprising a lens,
   wherein the marker light is accommodated in the first tapered opening or the second tapered opening,
   wherein a diameter of the opening defined by the lip is less than a diameter of the lens, and
   wherein the lip contacts the lens.

15. A method of installing a marker light on a vehicle utilizing the anti-theft bracket of claim 1, the method comprising:
   inserting the marker light into the first tapered opening or the second tapered opening depending on a height of a lens of the marker light; and
   securing the anti-theft bracket to the vehicle.

16. The method of claim 15, wherein the securing the anti-theft bracket to the vehicle comprises inserting blind rivets into through holes in the transparent body and utilizing a rivet tool to attach the anti-theft bracket to the vehicle with the blind rivets.

* * * * *